(12) United States Patent
Gilder et al.

(10) Patent No.: US 7,785,437 B2
(45) Date of Patent: Aug. 31, 2010

(54) ANTI-MICROBIAL CARPET UNDERLAY AND METHOD OF MAKING

(75) Inventors: Stephen D. Gilder, Chula Vista, CA (US); Martin J. Lovato, Cape Coral, FL (US); William A. Griggs, Southaven, MS (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 11/627,610

(22) Filed: Jan. 26, 2007

(65) Prior Publication Data

US 2007/0122608 A1    May 31, 2007

Related U.S. Application Data

(62) Division of application No. 10/840,309, filed on May 6, 2004, now abandoned.

(60) Provisional application No. 60/506,688, filed on Sep. 26, 2003.

(51) Int. Cl.
*A61F 13/15* (2006.01)
*B27N 3/00* (2006.01)
*B32B 17/00* (2006.01)
*B32B 3/00* (2006.01)
*B32B 5/00* (2006.01)
*B32B 5/18* (2006.01)
*B32B 38/04* (2006.01)
*B29C 65/00* (2006.01)

(52) U.S. Cl. .................. 156/250; 156/62.2; 156/77; 156/78; 156/79

(58) Field of Classification Search ............ 156/62.2, 156/77–79, 242, 250
See application file for complete search history.

(56) References Cited

U.S. PATENT DOCUMENTS

| 1,474,423 A | 11/1923 | Maynard |
| 1,658,178 A | 2/1928 | Wenrich |
| 1,721,861 A | 7/1929 | Oden |
| 1,793,666 A | 2/1931 | Baldwin |

(Continued)

FOREIGN PATENT DOCUMENTS

| CA | 846453 | 7/1970 |

(Continued)

OTHER PUBLICATIONS

Chem Industry.com; http://www.chemindustry.com/chemicals/705376.html.*

(Continued)

*Primary Examiner*—Philip C Tucker
*Assistant Examiner*—Michael N Orlando
(74) *Attorney, Agent, or Firm*—Kristin Jordan Harkins; Conley Rose, P.C.

(57) ABSTRACT

A method for making antimicrobial rebonded carpet pad includes mixing zinc pyrithione with a polyol to form an antimicrobial polyol mixture concentrate, blending the antimicrobial polyol mixture concentrate with a binder stream, mixing the binder with foam particles and curing the binder. The percentage of zinc pyrithione mixed with the polyol and the addition ratio of the antimicrobial polyol mixture concentrate with the binder stream are selected to provide an overall concentration of zinc pyrithione in the binder of at least about 7500 ppm. The particles and binder are cured into a block and sliced to form carpet pad.

11 Claims, 2 Drawing Sheets

U.S. PATENT DOCUMENTS

| | | |
|---|---|---|
| 1,872,846 A | 8/1932 | Thiele |
| 1,971,439 A | 8/1934 | Arnold |
| 2,069,755 A | 2/1937 | Foster |
| 2,118,076 A | 5/1938 | Farr |
| 2,160,729 A | 5/1939 | Graham et al. |
| 2,196,387 A | 4/1940 | Elmendorf |
| 2,430,934 A | 11/1947 | Kemmler et al. |
| 2,590,032 A | 3/1952 | Petry |
| 2,622,039 A | 12/1952 | Bingell |
| 2,638,638 A | 5/1953 | McBride |
| 2,809,971 A | 10/1957 | Bernstein, et al. |
| 2,957,793 A | 10/1960 | Dickey |
| 3,172,072 A | 3/1965 | Willy |
| 3,262,134 A | 7/1966 | Bramble |
| 3,360,422 A | 12/1967 | Desch |
| 3,385,751 A | 5/1968 | Willard et al. |
| 3,455,772 A | 7/1969 | Mason et al. |
| 3,497,416 A | 2/1970 | Critchfield et al. |
| 3,516,894 A | 6/1970 | Slosberg |
| 3,546,060 A | 12/1970 | Hoppe et al. |
| 3,576,706 A | 4/1971 | Baumann et al. |
| 3,619,315 A | 11/1971 | Carrack et al. |
| 3,620,890 A | 11/1971 | Kemmler |
| 3,664,863 A | 5/1972 | Dijkhuizen et al. |
| 3,713,868 A | 1/1973 | Gordon et al. |
| 3,726,624 A | 4/1973 | Schwarz |
| 3,804,699 A | 4/1974 | Johnson |
| 3,804,700 A | 4/1974 | Hoey |
| 3,821,065 A | 6/1974 | Copeland et al. |
| 3,886,941 A | 6/1975 | Duane et al. |
| 3,891,487 A | 6/1975 | Hoey |
| 3,911,186 A | 10/1975 | Trotman |
| 3,933,548 A | 1/1976 | Anderson, Jr. et al. |
| 3,943,018 A | 3/1976 | Petry et al. |
| 4,015,041 A | 3/1977 | Koschatzky et al. |
| 4,037,013 A | 7/1977 | Sprague |
| 4,073,998 A | 2/1978 | O'Connor |
| 4,078,293 A | 3/1978 | Aine |
| 4,083,324 A | 4/1978 | Krumweide |
| 4,088,805 A | 5/1978 | Wiegand |
| 4,096,303 A | 6/1978 | Doerfling |
| 4,175,154 A | 11/1979 | Faust et al. |
| 4,185,146 A | 1/1980 | Burke |
| 4,187,337 A | 2/1980 | Romageon |
| 4,195,634 A | 4/1980 | DiSalvo et al. |
| 4,199,635 A | 4/1980 | Parker |
| 4,234,649 A | 11/1980 | Ward |
| 4,237,181 A | 12/1980 | Tanabe et al. |
| 4,251,587 A | 2/1981 | Mimura et al. |
| 4,262,051 A | 4/1981 | Welz et al. |
| 4,283,456 A | 8/1981 | Creasy |
| 4,289,818 A | 9/1981 | Casamayor |
| 4,329,386 A | 5/1982 | Samowich |
| 4,336,293 A | 6/1982 | Eiden |
| 4,401,770 A | 8/1983 | Hance |
| 4,405,668 A | 9/1983 | Wald |
| 4,409,275 A | 10/1983 | Samowich |
| 4,421,807 A | 12/1983 | Clausing et al. |
| 4,423,694 A | 1/1984 | Senneville |
| 4,463,053 A | 7/1984 | Brinegar |
| 4,482,593 A | 11/1984 | Sagel et al. |
| 4,500,591 A | 2/1985 | Peltier et al. |
| 4,510,201 A | 4/1985 | Takeuchi et al. |
| 4,533,588 A | 8/1985 | Kraft |
| 4,579,764 A | 4/1986 | Peoples, Jr. et al. |
| 4,647,484 A | 3/1987 | Higgins |
| 4,658,554 A | 4/1987 | Riley et al. |
| 4,710,415 A | 12/1987 | Slosberg et al. |
| 4,766,031 A | 8/1988 | Kohl |
| 4,804,425 A | 2/1989 | Hoffmann et al. |
| 4,824,498 A | 4/1989 | Goodwin et al. |
| 4,828,908 A | 5/1989 | Park et al. |
| 4,844,765 A | 7/1989 | Reith |
| 4,853,280 A | 8/1989 | Poteet |
| 4,933,011 A | 6/1990 | Rei |
| 4,957,798 A | 9/1990 | Bogdany |
| 4,966,609 A | 10/1990 | Callinan et al. |
| 5,037,690 A | 8/1991 | van der Kooy |
| 5,045,389 A | 9/1991 | Campagna |
| 5,082,705 A | 1/1992 | Rose |
| 5,104,712 A | 4/1992 | Walters |
| 5,108,094 A | 4/1992 | Quinn et al. |
| 5,110,843 A | 5/1992 | Bries et al. |
| 5,114,984 A | 5/1992 | Branch et al. |
| 5,120,587 A | 6/1992 | McDermott, III et al. |
| 5,215,805 A | 6/1993 | Pavia, Jr. |
| 5,230,940 A | 7/1993 | Bohm et al. |
| 5,262,735 A | 11/1993 | Hashimoto et al. |
| 5,295,883 A | 3/1994 | Moran |
| 5,312,888 A | 5/1994 | Nafziger et al. |
| 5,314,987 A * | 5/1994 | Kim et al. .................. 528/289 |
| 5,346,278 A | 9/1994 | Dehondt |
| 5,416,142 A | 5/1995 | Bush et al. |
| 5,460,870 A | 10/1995 | Arthurs |
| 5,501,895 A | 3/1996 | Finley et al. |
| 5,503,840 A | 4/1996 | Jacobson et al. |
| 5,531,849 A | 7/1996 | Collins et al. |
| 5,536,556 A | 7/1996 | Juriga |
| 5,543,193 A | 8/1996 | Tesch |
| 5,565,259 A | 10/1996 | Juriga |
| 5,578,363 A | 11/1996 | Finley et al. |
| 5,582,906 A | 12/1996 | Romesberg et al. |
| 5,601,910 A | 2/1997 | Murphy et al. |
| 5,645,664 A | 7/1997 | Clyne |
| 5,653,099 A | 8/1997 | MacKenzie |
| 5,681,637 A | 10/1997 | Kessler et al. |
| 5,707,903 A | 1/1998 | Schottenfeld |
| 5,736,466 A | 4/1998 | Wierer et al. |
| 5,762,650 A | 6/1998 | Ruggiero et al. |
| 5,762,735 A | 6/1998 | Collins et al. |
| 5,763,040 A | 6/1998 | Murphy et al. |
| 5,765,318 A | 6/1998 | Michelsen |
| 5,804,262 A | 9/1998 | Stevens et al. |
| 5,817,703 A * | 10/1998 | Blair et al. .................. 521/53 |
| 5,837,620 A | 11/1998 | Kajander |
| 5,846,461 A | 12/1998 | Collins et al. |
| 5,846,620 A | 12/1998 | Compton |
| 5,854,144 A | 12/1998 | Hawley |
| 5,863,845 A | 1/1999 | Owen |
| 5,874,371 A | 2/1999 | Owen |
| 5,880,165 A | 3/1999 | Triolo et al. |
| 5,902,658 A | 5/1999 | Wyman |
| 5,910,358 A | 6/1999 | Thoen et al. |
| 5,935,675 A | 8/1999 | Hayden et al. |
| 5,935,878 A | 8/1999 | Glasser |
| 5,950,389 A | 9/1999 | Porter |
| 5,951,799 A | 9/1999 | Williamson et al. |
| 5,968,630 A | 10/1999 | Foster |
| 5,994,242 A | 11/1999 | Arthurs |
| 6,022,617 A | 2/2000 | Calkins |
| 6,061,876 A | 5/2000 | Rowe |
| 6,130,174 A | 10/2000 | Hawley et al. |
| 6,132,844 A | 10/2000 | Altshuler et al. |
| 6,136,870 A | 10/2000 | Triolo et al. |
| 6,159,583 A | 12/2000 | Calkins |
| 6,162,748 A | 12/2000 | Schilling et al. |
| 6,187,865 B1 | 2/2001 | Brodeur, Jr. |
| 6,189,279 B1 | 2/2001 | Fiechtl |
| 6,214,456 B1 | 4/2001 | Boyd et al. |
| 6,221,796 B1 | 4/2001 | Hawley et al. |
| 6,253,526 B1 | 7/2001 | Murphy et al. |
| 6,255,237 B1 | 7/2001 | Sakamoto et al. |
| 6,261,667 B1 | 7/2001 | Yang |
| 6,279,284 B1 | 8/2001 | Moras |

| | | |
|---|---|---|
| 6,294,589 B1 | 9/2001 | Moody |
| 6,296,075 B1 | 10/2001 | Gish et al. |
| 6,329,437 B1 | 12/2001 | Vincent et al. |
| 6,416,854 B2 | 7/2002 | Hunter, Jr. |
| 6,418,687 B1 | 7/2002 | Cox |
| 6,448,305 B1 | 9/2002 | Watterson, III et al. |
| 6,451,868 B1 | 9/2002 | Kaneda et al. |
| 6,558,786 B1 | 5/2003 | Jupina |
| 6,562,173 B1 | 5/2003 | Collison et al. |
| 6,576,577 B1 | 6/2003 | Garner |
| 6,607,803 B2 | 8/2003 | Foster |
| 6,629,340 B1 | 10/2003 | Dale et al. |
| 6,631,785 B2 | 10/2003 | Khambete et al. |
| 6,659,223 B2 | 12/2003 | Allison et al. |
| 6,769,217 B2 | 8/2004 | Nelson |
| 6,872,445 B2 | 3/2005 | Vinod |
| RE39,010 E | 3/2006 | Gish et al. |
| 7,008,691 B2 | 3/2006 | Ogle |
| 7,047,705 B2 | 5/2006 | Foster |
| 7,096,630 B1 | 8/2006 | Keene et al. |
| 7,182,989 B2 | 2/2007 | Higgins et al. |
| 7,279,058 B2 | 10/2007 | Morgan |
| 7,491,753 B2 | 2/2009 | Krishnan |
| 7,566,406 B2 | 7/2009 | Gilder |
| 7,678,719 B2 | 3/2010 | Ogle et al. |
| 2001/0049917 A1 | 12/2001 | Simonelli et al. |
| 2002/0013560 A1 | 1/2002 | Erspamer et al. |
| 2002/0025751 A1 | 2/2002 | Chen et al. |
| 2002/0094404 A1 | 7/2002 | Schottenfeld |
| 2002/0119281 A1 | 8/2002 | Higgins et al. |
| 2002/0132085 A1 | 9/2002 | Higgins et al. |
| 2002/0142126 A1 | 10/2002 | Higgins et al. |
| 2002/0145089 A1 | 10/2002 | Calkins |
| 2002/0155274 A1 | 10/2002 | Ramesh et al. |
| 2002/0193026 A1 | 12/2002 | Ota et al. |
| 2002/0197922 A1 | 12/2002 | Sobonya et al. |
| 2003/0033779 A1 | 2/2003 | Downey |
| 2003/0035942 A1 | 2/2003 | Mertl et al. |
| 2003/0036323 A1 | 2/2003 | Aliabadi |
| 2003/0072911 A1 | 4/2003 | Higgins et al. |
| 2003/0096545 A1 | 5/2003 | Payne |
| 2003/0104205 A1 | 6/2003 | Brodeur, Jr. et al. |
| 2003/0116379 A1 | 6/2003 | Khambete et al. |
| 2003/0165657 A1 | 9/2003 | Rockwell, Jr. |
| 2003/0170420 A1 | 9/2003 | Higgins et al. |
| 2003/0175475 A1 | 9/2003 | Higgins et al. |
| 2003/0203152 A1 | 10/2003 | Higgins et al. |
| 2003/0215618 A1 | 11/2003 | Hynicka et al. |
| 2003/0219582 A1 | 11/2003 | Ramesh et al. |
| 2004/0022994 A1 | 2/2004 | Higgins et al. |
| 2004/0050015 A1 | 3/2004 | Foster |
| 2004/0069924 A1 | 4/2004 | Lemieux et al. |
| 2004/0071927 A1 | 4/2004 | Murphy et al. |
| 2004/0099476 A1 | 5/2004 | Swift et al. |
| 2004/0121691 A1 | 6/2004 | Klein |
| 2004/0131836 A1 | 7/2004 | Thompson |
| 2004/0140151 A1 | 7/2004 | Gallant |
| 2004/0172905 A1 | 9/2004 | Collison et al. |
| 2005/0004245 A1 | 1/2005 | Hamrick et al. |
| 2005/0069694 A1 | 3/2005 | Gilder et al. |
| 2005/0079314 A1 | 4/2005 | Brodeur, Jr. et al. |
| 2005/0257469 A1 | 11/2005 | Bennett et al. |
| 2006/0035990 A1 | 2/2006 | Hennington et al. |
| 2006/0070326 A1 | 4/2006 | Collison et al. |
| 2006/0144012 A1 | 7/2006 | Manning et al. |
| 2006/0179752 A1 | 8/2006 | Swanson et al. |
| 2006/0207170 A1 | 9/2006 | Smith |
| 2006/0270747 A1 | 11/2006 | Griggs |
| 2007/0039268 A1 | 2/2007 | Ambrose, Jr. et al. |
| 2007/0066697 A1 | 3/2007 | Gilder et al. |
| 2007/0078193 A1 | 4/2007 | Gilder et al. |
| 2007/0122608 A1 | 5/2007 | Gilder et al. |
| 2007/0154672 A1 | 7/2007 | Higgins et al. |
| 2007/0199270 A1 | 8/2007 | Weir et al. |
| 2007/0275827 A1 | 11/2007 | Glaser |
| 2008/0072374 A1 | 3/2008 | Abesingha |
| 2008/0075915 A1 | 3/2008 | Wening et al. |
| 2008/0226584 A1 | 9/2008 | Krishnan |
| 2009/0123688 A1 | 5/2009 | Miller et al. |

FOREIGN PATENT DOCUMENTS

| | | |
|---|---|---|
| EP | 0878589 | 11/1998 |
| EP | 0967340 A2 | 12/1999 |
| EP | 1365086 A2 | 11/2003 |
| GB | 1182458 | 2/1970 |
| GB | 2042368 A | 9/1980 |
| GB | 1581169 | 12/1980 |
| GB | 2349356 A | 11/2000 |
| JP | 8277622 | 10/1996 |
| JP | 2002086655 | 3/2002 |
| JP | 2002331625 | 11/2002 |
| KR | 2004099660 | 12/2004 |
| KR | 2004111301 | 12/2004 |
| KR | 2005036036 | 4/2005 |
| WO | WO 02/052114 A1 | 7/2002 |
| WO | 2007040265 | 4/2007 |

OTHER PUBLICATIONS

"Reference: Polymer Properties", available at http://www.sigmaaldrich.com/aldrich/brochure/al_pp_applications.pdf, printed on Nov. 28, 2007, pp. 50-51 (2 pages).

Abstract of Japanese Patent No. 8277622, entitled "Sound Insulating Floor Material", published Oct. 22, 1996 (1 page).

* cited by examiner

ANTI-MICROBIAL CARPET UNDERLAY AND METHOD OF MAKING

CROSS-REFERENCE TO RELATED APPLICATIONS

This is a Divisional Application of U.S. patent application Ser. No. 10/840,309, filed May 6, 2004 and now abandoned, entitled "Anti-Microbial Carpet Underlay and Method of Making," which claims the benefit under 35 U.S.C. §119 of U.S. provisional application Ser. No. 60/506,688 filed Sep. 26, 2003 and entitled "Anti-Microbial Carpet Pad and Method of Making," both of which are hereby incorporated herein by reference for all purposes.

FIELD OF THE INVENTION

This invention relates to antimicrobial rebonded carpet underlay and more particularly to a method of making such underlay by mixing an anti-microbial agent in binder used to make the rebonded carpet underlay.

BACKGROUND OF THE INVENTION

Carpet, especially wall-to-wall carpet, is normally installed with an underlay, often in the form of a foam pad or cushion. Moisture, dirt, food particles, and other debris tend to filter through the carpet to the pad. These conditions provide a breeding ground for various bacteria and mold that may produce undesirable odors, cause degradation of the carpet and/or pad, and/or contribute to a poor indoor air quality environment for occupants of the premises.

A typical carpet pad consists of ground polyurethane foam particles of a specific size range that are rebonded back together to form a continuous foam pad of various densities and thickness. Typically, carpet pad ranges in density from four to eight pounds per cubic foot. Rebonded pad is made from recycled polyurethane foam, typically from scraps of foam reclaimed from padding used in furniture, bedding, and automobile seating. The scraps are often of different sizes and colors. The rebonded foam is produced by grinding or chopping the scraps, mixing the chopped scraps with a binder, curing the binder, and slicing the resulting block of rebonded foam particles into a desired pad thickness. The binder may typically form ten percent of the weight of the final rebonded pad. Various films or webs may be bonded to one or both sides of the pad for various purposes.

SUMMARY OF THE INVENTION

A method of making antimicrobial rebonded carpet pad includes mixing zinc pyrithione with a polyol to form an antimicrobial polyol mixture concentrate, and blending the antimicrobial polyol mixture concentrate with a binder stream used to make rebonded carpet pad.

In an embodiment, the percentage of zinc pyrithione mixed with the polyol and the addition ratio of the antimicrobial polyol mixture concentrate with the binder stream are selected to provide an overall concentration of zinc pyrithione in the binder of at least about 7500 ppm.

In one embodiment, an antimicrobial carpet underlay comprises a rebonded pad comprising particles of foam joined together with a binder prepared according to the described method.

DETAILED DESCRIPTION OF THE PREFERRED EMBODIMENTS

Figure 1:
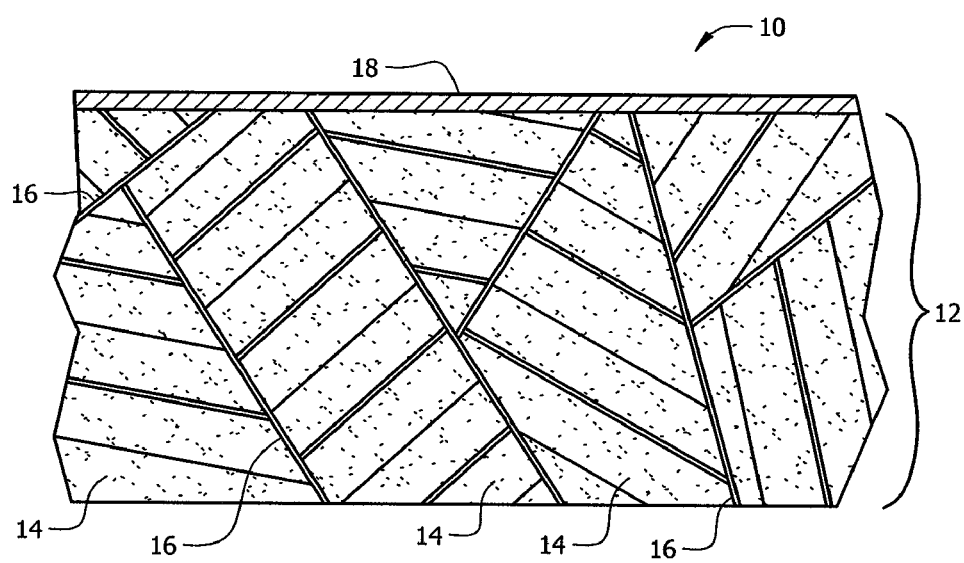
FIG. 1 is a cross sectional view of a carpet underlay according to one embodiment of the present invention.

FIG. 1 is a cross sectional illustration of an antimicrobial carpet underlay 10 which may be made according to one embodiment of the present invention. The underlay 10 includes a rebonded pad portion 12 including a number of small pieces of foam 14 bonded together by binder 16. The foam pieces 14 may typically be ground or chopped scraps of polyurethane foam used in making furniture. The underlay 10 may also include a film 18 bonded to at least one surface of the pad 12, in this case the upper surface of the pad 12. The film 18 is typically preferred to facilitate laying carpet on top of the underlay 10 and for resisting the flow of fluids into the pad 12, e.g. when fluids are spilled on carpet installed over the pad 12. A film 18 may also be laminated to the lower side of the pad 12 if desired. In the present invention, the carpet underlay 10 is resistant to the growth of bacteria and mold on and within the underlay 10. This antimicrobial resistance is achieved by adding an effective amount of an antimicrobial compound to the pad 12 and/or to the film 18, as described in more detail below.

In one embodiment, an effective biocide, or antimicrobial, compound known as zinc pyrithione (e.g. the material sold under the trademark ZINC OMADINE by Arch Chemicals Inc.) is incorporated into rebonded carpet pad 12 by the following method. The chemical name for this compound is Bis(1-hydroxy-2(1H)-pyridinethionato-O,S)-(T-4)Zinc. The zinc pyrithione in powdered form is mixed with a triol polyol of a molecular weight typically ranging from 3000 to 3500 to form a 20% strength antimicrobial/polyol mixture concentrate. Then, the 20% antimicrobial/polyol mixture concentrate is added to a binder stream at a 3.90% to 6.50% addition level to render a zinc pyrithione concentration of between 7500 to 12500 ppm in the binder 16. The antimicrobial/polyol mixture concentrate and binder stream are preferably held at between about 90 and about 100 degrees F. during mixing and use. The binder 16 is typically composed of ⅓ aromatic oil, ⅓ triol polyol, and ⅓ polymeric MDI. The binder is added to ground foam particles, mixed together, compressed, injected with steam, and dried in the form of a large block of rebonded foam particles. The block is then sliced into thicknesses suitable for carpet pad, e.g. three-eighth to five-eighth inch, to produce the rebonded foam pad 12. The binder to ground foam weight ratio is approximately 1:10. The final concentration of Zinc Pyrithione in the rebonded pad 12 is therefore from about 750 ppm to about 1250 ppm.

If desired, the particular concentration of zinc pyrithione in the antimicrobial/polyol mixture concentrate may be selected to be more or less than the 20% concentration used in this embodiment. The addition level of the antimicrobial/polyol mixture concentrate in the binder 16 may then be adjusted to achieve a zinc pyrithione concentration of at least about 7500 ppm and preferably between about 7500 to about 12500 ppm in the binder 16.

If desired, a binder 16 to ground foam weight ratio of more or less than 1:10 may be used. If other ratios are used, the particular concentration of zinc pyrithione in the antimicrobial/polyol mixture concentrate and/or the addition level of the antimicrobial/polyol mixture concentrate in the binder 16 may then be adjusted to achieve a final concentration of Zinc Pyrithione in the rebonded pad 12 from about 750 ppm to about 1250 ppm.

Figure 2:
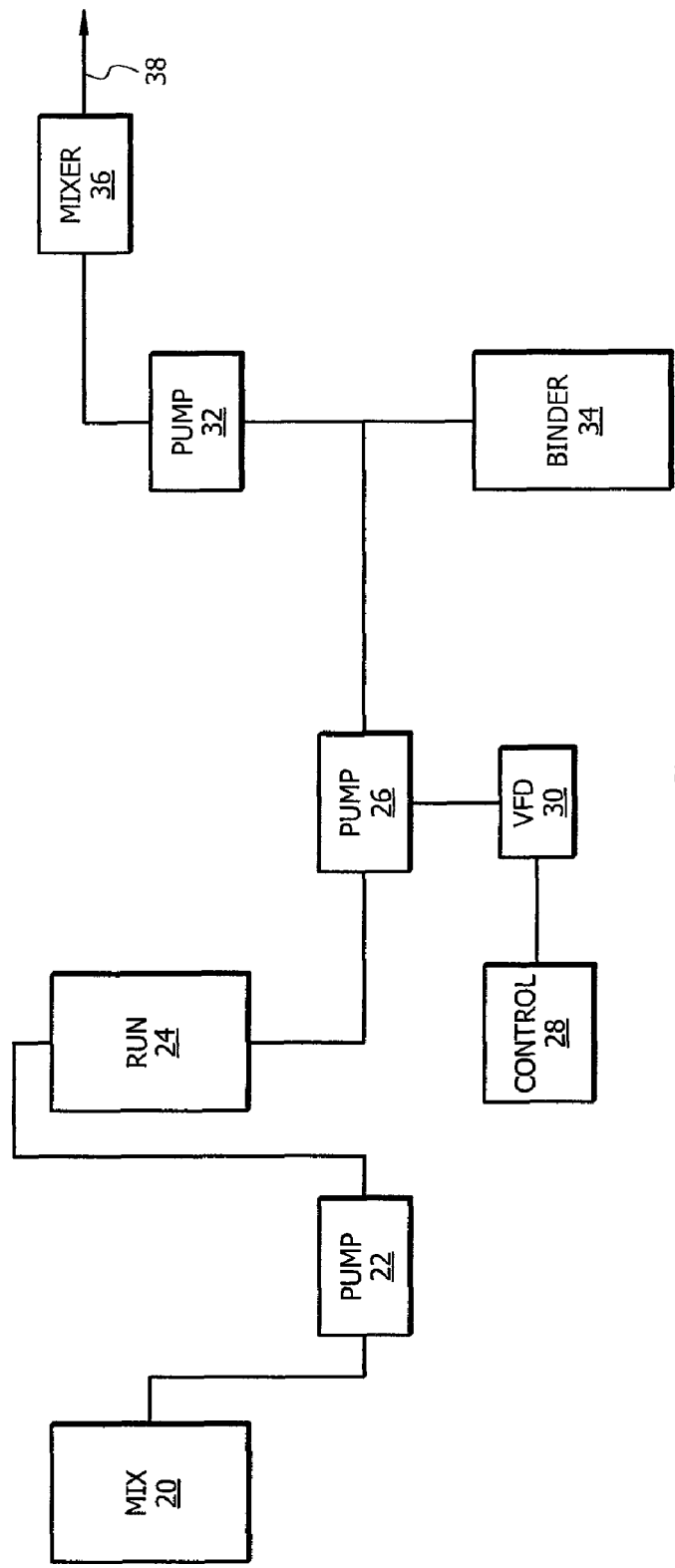
FIG. 2 is a block diagram of a binder mixing system used in making rebonded pad for testing the present invention.

FIG. 2 illustrates a mixing system used in making binder 16 for testing the present invention. A method for making binder 16 will be described with reference to FIG. 2. A mix tank 20 included a thirty-gallon drum and a vortex type mixer. Eighty pounds of polyol and twenty pounds of powdered zinc pyrithione were placed in tank 20 and mixed for at least three hours. A transfer pump 22 was used to pump the mixture from mix tank 20 to a run tank 24, which also includes a vortex mixer. The antimicrobial/polyol mixture concentrate in the run tank 24 was mixed constantly during production. If the mixer is turned off for any significant period of time, it should be restarted at least two hours prior to use in production of rebonded pad 12.

During production of rebonded pad 12, a variable speed Watson Marlow pump 26 was used to flow the antimicrobial/polyol mixture concentrate from the run tank 24 at a controllable rate. The rate is controlled by a control panel 28 and a variable frequency drive 30. The discharge side of pump 26 is connected to the vacuum side of a binder pump 32. A tank 34 of binder also has an outlet connected to the vacuum side of a binder pump 32. The discharge side of pump 32 is connected to a static mixer 36. The outlet 38 of mixer 36 is coupled to a blender where polyurethane particles 14 are mixed with binder 16 to produce the finished rebonded polyurethane pad 12.

During the operation of the system of FIG. 2, it is preferred that the antimicrobial/polyol mixture concentrate in the mix tank 20 and run tank 24 be maintained at a temperature of between about 90 and about 100 degrees F. during mixing and production operations. Likewise, the binder tank 34 is preferable maintained within the same temperature range.

It is sometimes desirable to include laminating film 18 on one or both surfaces of carpet pad 12. For example, such a film 18 may facilitate laying and stretching of carpet by allowing the carpet to slide easily on top of the pad 12 and avoiding undesirable movement or buckling of the pad 12. The film may also prevent fluids spilled on carpet from penetrating into the pad 12. In one embodiment of the present invention, an antimicrobial laminating film 18 is laminated onto one or both surfaces of a carpet pad. The carpet pad may or may not include an antimicrobial compound as disclosed above.

The anti-microbial laminating film 18 of this embodiment inhibits the growth of certain bacteria and fungus when used in combination with prime polyurethane foam pad or rebonded polyurethane foam pad 12 as carpet underlay. The anti-microbial film may be thermally laminated to the top and/or bottom surfaces of prime polyurethane foam pad or re-bonded polyurethane flexible foam pad 12 where it acts as a barrier to inhibit the growth of microbes that accumulate on the surfaces of carpet underlay. This film 18 may also inhibit the growth of microorganisms in other products where this film can be used as a lamination barrier.

In this embodiment, a 0.45 to 0.50 mil monolayer blown film 18 includes between 500 and 1500 ppm of the antimicrobial compound zinc pyrithione (e.g. the material sold under the trademark ZINC OMADINE by Arch Chemicals Inc.). The chemical name for this compound is Bis(1-hydroxy-2(1H)-pyridinethionato-O,S)-(T-4)Zinc. The zinc pyrithione powder is incorporated at 10% by weight into a LLDPE, linear low density polyethylene, resin concentrate supplied by PolyChem Alloy, Inc. under the trademark POLYSEPT 554Z. The chemical description of the resin concentrate is Mercaptopyridine-N-oxide in Polypropylene. This resin concentrate has a specific melt index of 20 grams/10 mins. and 0.93 density. About 1% to about 3% by weight of this concentrate is then blended with a LLDPE/Copolymer resin mixture. Due to thermal breakdown of zinc pyrithione during processing of the film, the initial 10% concentration of zinc pyrithione in the concentrate may be effectively reduced to less than 6%. After mixing with the resin mixture and processing it into a film, the net effective concentration of zinc pyrithione in the processed film is about 500 ppm to 1500 ppm. Suitable copolymer resins may be EVA, EMA, or EMM. The copolymer resin consists of approximately 60-70% by weight of the total mixture. The remaining mixture is 30-40% LLDPE by weight, including the 1-3% LLDPE concentrate treated with zinc pyrithione. The blended resins may then be extruded at between 450 and 550 degrees F. with a blow up ratio, i.e. bubble diameter to die diameter, of between 1.8 and 2.5:1. It is preferred that the extrusion temperature be kept below 500 degrees F. to minimize thermal breakdown of the zinc pyrithione.

It is apparent that zinc pyrithione powder may be incorporated at more or less than 10% by weight into the resin concentrate. If other addition levels are selected, the percentage of the concentrate blended with the LLDPE/Copolymer resin mixture may be adjusted to achieve a net effective concentration of zinc pyrithione in the processed film of from about 500 ppm to 1500 ppm.

The anti-microbial treated film may be thermally laminated (e.g. at about 250-450 degrees F, 0.5 sec dwell time) to one or both sides of a prime polyurethane foam pad or rebonded pad 12 which may typically be from about three-eighth inch to about five-eighth inch thick or other desired thickness. Other laminating methods may be used if desired, e.g. by use of an adhesive. The anti-microbial film may be laminated to an anti-microbial treated pad or non-anti-microbial treated pad. The anti-microbial film may also be laminated to another anti-microbial treated or untreated film for lamination to antimicrobial treated pad or non-anti-microbial treated pad.

Biocidal effectiveness of the rebonded carpet pad 12 and/or film 18 according the present invention may be determined by measuring inhibition of growth of bacterial and/or fungus using AATCC (American Association of Textile Chemists and Colorists) 174, ASTM E2180-1, and ASTM D 3273 test protocols compared to non-treated control standards. The AATCC 174 protocol was developed for determining the antimicrobial activity of new carpet materials.

A number of specimens of carpet underlay 10 were made by methods described above, with various concentrations of zinc pyrithione in the binder 16 and film 18 for testing to determine levels that provide an effective antimicrobial effect. The specimens included a film 18 on one side as illustrated in FIG. 1. This allowed testing of the foam side of the specimens to indicate antimicrobial effect of the pad 12 without film 18 and testing of the film side to indicate anti-microbial effect of the pad 12 with film 18. The AATCC 174 test method provides for testing both unwashed and washed samples. Washed samples were treated according to the AATCC 138 protocol. The test results are summarized as follows.

The AATCC 174 test method includes three parts. Part I is a qualitative test for antibacterial activity. Test specimens are placed into contact with a nutrient agar which has been streaked with a bacterial culture. The specimens are then incubated. After incubation, a clear area of interrupted growth underneath and along the sides of the test specimen indicates antibacterial activity of the specimen. Standard strains of bacteria are used, with *Staphylococcus aureus* and *Klebsiella pneumoniae* being the representative organisms.

In the AATCC 174, Part I tests various washed and unwashed specimens were tested. An unwashed foam side specimen with 751 ppm of zinc pyrithione passed the test with a one millimeter zone of inhibition for *Klebsiella pneumoniae* and a two millimeter zone of inhibition for *Staphylococcus aureus*. All unwashed and washed foam side specimens with a concentration of 1096 ppm or more of zinc pyrithione inhibited the growth of *Klebsiella pneumoniae* from underneath and along the sides of the specimen.

The AATCC 174, Part II test provides a quantitative procedure for the evaluation of the degree of antibacterial activity. Test specimens are inoculated with the test microorganisms. After incubation, the bacteria are eluted from specimens by shaking in 100 milliliters of liquid. The number of bacteria present in the liquid is determined and the percent reduction produced by the specimen is calculated.

In the AATCC 174, Part II tests, washed foam side specimens containing 751 and 1096 ppm of zinc pyrithione provided a 90% reduction in the numbers of both *Staphylococcus aureus* and *Klebsiella pneumoniae*. In all unwashed and washed film and foam side specimens containing a concentration of 500 ppm or more of zinc pyrithione in the film and 1096 ppm of zinc pyrithione in the pad, there was a reduction of at least 66% in *Staphylococcus aureus* with an average reduction of 92%.

The AATCC 174, Part III protocol provides a qualitative test for antifungal activity. Specimens are subjected to the growth of a common fungus, *Aspergillus niger*, on Sabouraud Dextrose agar. Prewet specimens are inoculated and incubated at 28 degrees C. for seven days. Specimens are then assessed for growth of the fungus.

In the AATCC 174, Part III tests, washed and unwashed foam side samples with a concentration of 1096 ppm of zinc pyrithione in the pad produced no observable fungus growth. No growth was observed on washed and unwashed film side samples when the concentration of zinc pyrithione in the film was 1500 ppm or greater.

Inhibitory mold activity was also tested by the ASTM E2180-01 test method. Good inhibitory activity for *Aspergillus niger* was observed when film side specimens had a total minimum combined concentration of 1600 ppm of zinc pyrithione. The total combined concentration is the sum of the concentration in the pad 12 of a specimen and the concentration in the film 18 of the specimen. The tests indicate that a minimum of 500 ppm may be preferred in the film 18, with a preferred complement minimum of 1100 ppm in the pad 12. Alternatively, a minimum concentration of 750 ppm may be preferred in the pad 12 with a preferred complement minimum of 850 ppm in the film 18. Good results were achieved for some, but not all, specimens with a total combined concentration of 1251 ppm, i.e. 751 ppm in the pad 12 and 500 ppm in the film 18. Therefore, the preferred minimum combined concentration is about 1600 ppm.

Mold susceptibility tests were also performed under the ASTM D3273 test method. No *Aspergillus niger* mold colonization was observed on film 18 side specimens when the specimens had a total minimum combined concentration of about 1600 ppm zinc pyrithione. The tests indicate that a minimum of 500 ppm may be preferred in the film 18, with a preferred complement minimum of 1100 ppm in the pad 12. Alternatively, a minimum concentration of 750 ppm may be preferred in the pad 12 with a preferred complement minimum of 850 ppm in the film 18.

The above described tests indicate that an effective antimicrobial carpet underlay 10 can be made by incorporating 7500 to 12500 ppm of zinc pyrithione into binder used to bind foam particles to make rebonded carpet pad. The net concentration in the foam pad 12 is from 750 to 1250 ppm of zinc pyrithione when the binder to foam weight is 1:10. If different ratios of binder to foam are used, it is preferred to adjust the concentration in the binder stream to achieve at least about 750 ppm of zinc pyrithione in the final foam pad 12.

The tests also indicate that an effective antimicrobial film can be made by incorporating 500 to 1500 ppm of zinc pyrithione in the film 18. As noted above, the initial concentration is preferably adjusted to account for thermal degradation which occurs during film processing. Thus, the initial ten percent concentration of zinc pyrithione in the resin concentrate may be reduced to an effective five to six percent after processing.

The tests also show that when both a foam pad 12 and a film 18 including a biocide are combined to form a carpet underlay, lower concentrations of zinc pyrithione may be used than may be necessary if only the pad 12 or the film 18 contains the biocide. In general, in a carpet underlay having a biocide treated pad 12, but an untreated film 18, the pad 12 preferably has a biocide concentration near the upper end of the range tested, e.g. at least about 1100 to 1250 ppm of zinc pyrithione. For an underlay having an untreated pad 12, and a treated film 18, the film 18 preferably has a biocide concentration near the upper end of the range tested, e.g. at least about 1100 to 1500 ppm of zinc pyrithione. When both the pad 12 and film 18 are treated, it is preferred that the combined concentrations for foam pad 12 and film 18 be at least about 1600 ppm.

In the above disclosure, the concentrations of biocide in the foam pad 12 and film 18 have been discussed in terms of ranges having a lower limit and an upper limit. It is apparent that it is preferred to include concentrations at or above the lower limits to achieve an effective antimicrobial activity in the products. That is, concentrations above the ranges tested should also be effective. Concentrations should be kept below a level at which the biocide may affect the mechanical integrity of the product. Since the biocide is a relatively high cost part of the product, normal practice should be to avoid using more of the biocide than is needed to achieve effective biocidal or antimicrobial activity.

The particular choice of an effective amount of the biocide also depends upon the particular application in which the carpet pad will be used. In some applications, there is a requirement that carpet products exhibit effective antimicrobial activity after being washed. For those applications, it may be desirable to use a concentration at or near the upper limits of the ranges given above. In the tests reported above, the specimens at the upper ends of the ranges provided effective antimicrobial activity after washing. If the application does not require washing, a lower concentration of biocide provides an effective biocidal activity.

In the above description of making the rebonded foam pad 12, zinc pyrithione was initially mixed in powder form with a polyol. The resulting mixture is basically a suspension of particles in a liquid. As noted in the description of FIG. 2, it is desirable to continuously operate a mixer in run tank 24 to insure that the zinc pyrithione remains uniformly mixed with the polyol. It may be desirable to first dissolve the zinc pyrithione in a fluid which is miscible with a polyol. Such a process is described in U.S. Pat. No. 5,114,984 issued to Branch et al. on May 19, 1992. In that patent, a pyrithione salt is dissolved in an alkanolamine which is miscible with a polyol, which the Branch patent indicates may then be used to make an antimicrobially effective polyurethane. Such a solution of zinc pyrithione in polyol may also be suitable for mixing with the binder described above for use in the present invention.

While the present invention has been disclosed in terms of specific structures, chemical compositions and mixtures, and methods of making carpet underlay, it is apparent that various changes and substitutions of materials and steps may be made within the scope of the present invention as defined by the appended claims.

What we claim as our invention is:

1. A method, for making rebonded carpet pad, comprising:
   mixing zinc pyrithione with a polyol to form an antimicrobial polyol mixture concentrate;
   blending the antimicrobial polyol mixture concentrate with a binder stream to form a binder;
   selecting a percentage of zinc pyrithione mixed with the polyol and an addition ratio of the antimicrobial polyol mixture concentrate with the binder stream to provide an overall concentration of zinc pyrithione in the binder of at least about 7500 ppm;
   mixing the binder with foam particles;
   shaping the mixture of binder and foam particles into a block, curing the binder and slicing the block to a thickness to form carpet pad; and
   laminating a 0.45 to 0.5 mil monolayer blown film to at least one side of the carpet pad;
   wherein laminating a film to at least one side of the carpet pad comprises:
   forming an 0.45 to 0.5 mil monolayer blown film; and
   thermally laminating the film to at least one side of the carpet pad;
   wherein the film comprises an effective amount of an antimicrobial compound, and wherein the antimicrobial compound comprises zinc pyrithione; and
   wherein the net effective concentration of zinc pyrithione in the film is from about 500 ppm to 850 ppm.

2. The method for making rebonded carpet pad according to claim 1, further comprising:
   mixing zinc pyrithione with a triol polyol to a 20% strength antimicrobial polyol mixture concentrate, and
   blending the 20% strength antimicrobial polyol mixture concentrate with a binder stream at at least a 3.90% addition level to render a zinc pyrithione concentration of between 7,500 to 12,500 ppm in the binder.

3. The method according to claim 2, further comprising blending the 20% strength antimicrobial polyol mixture concentrate with a binder stream at a 3.90% to 6.5% addition level.

4. The method according to claim 1, wherein the ratio of binder to foam particles is about 1:10 and results in an overall concentration of zinc pyrithione in the carpet pad of at least about 750 ppm.

5. A method according to claim 4, wherein the overall concentration of zinc pyrithione in the carpet pad is about 750 ppm.

6. A method according to claim 1, wherein the block is sliced throughout to form carpet pad of a substantially uniform thickness between about ⅜ and ⅝ inch.

7. A method according to claim 1, wherein the binder stream comprises aromatic oil.

8. A method according to claim 1, wherein blending the antimicrobial polyol mixture concentrate with the binder stream forms a binder comprising about ⅓ aromatic oil, ⅓ triol polyol, and ⅓ polymeric MDI; and
   wherein the final concentration of zinc pyrithione in the carpet pad is about 750 ppm.

9. A method according to claim 1,
   wherein:
   the ratio of binder to foam particles is about 1:10 and results in an overall concentration of zinc pyrithione in the carpet pad between about 750 to 1250 ppm; and
   the minimum combined concentration of zinc pyrithione in the pad and the film is about 1600 ppm.

10. A method according to claim 9, wherein the film has a concentration of zinc pyrithione of about 850 ppm and the pad has a concentration of zinc pyrithione of about 750 ppm.

11. A method according to claim 1
   wherein blending the antimicrobial polyol mixture concentrate with binder stream comprises pumping the antimicrobial polyol mixture concentrate and binder stream through a static mixer and discharging binder from the static mixer onto the foam particles.

* * * * *

UNITED STATES PATENT AND TRADEMARK OFFICE
CERTIFICATE OF CORRECTION

| | | |
|---|---|---|
| PATENT NO. | : 7,785,437 B2 | Page 1 of 1 |
| APPLICATION NO. | : 11/627610 | |
| DATED | : August 31, 2010 | |
| INVENTOR(S) | : Stephen D. Gilder et al. | |

It is certified that error appears in the above-identified patent and that said Letters Patent is hereby corrected as shown below:

Column 4, line 7, replace "EMM" with -- EMAA --

Signed and Sealed this
Twenty-fifth Day of January, 2011

David J. Kappos
*Director of the United States Patent and Trademark Office*